United States Patent [19]

Rix

[11] Patent Number: 4,809,934

[45] Date of Patent: Mar. 7, 1989

[54] ON-BOARD DISPOSAL OF WATER IN AIRCRAFT FUEL TANKS

[75] Inventor: William J. Rix, Herts, England

[73] Assignee: British Aerospace Public Limited Company, London, England

[21] Appl. No.: 154,542

[22] Filed: Feb. 11, 1988

[30] Foreign Application Priority Data

Feb. 12, 1987 [GB] United Kingdom ............... 8703247

[51] Int. Cl.⁴ .............................................. B64D 37/00
[52] U.S. Cl. ................................................. 244/135 R
[58] Field of Search ............ 244/135 R, 135 B, 135 C; 137/899.2; 366/136, 249, 251

[56] References Cited

U.S. PATENT DOCUMENTS

| | | | |
|---|---|---|---|
| 2,547,246 | 4/1951 | Aspelin | 244/135 R |
| 2,953,156 | 9/1960 | Bryant | 244/135 R |
| 2,961,130 | 11/1960 | Adams | 244/135 R |
| 3,693,915 | 9/1972 | Uranovsky | 244/135 R |
| 3,963,040 | 6/1976 | Gezari | 137/899.2 |

Primary Examiner—Sherman D. Basinger
Assistant Examiner—Stephen P. Avila
Attorney, Agent, or Firm—Cushman, Darby & Cushman

[57] ABSTRACT

An aircraft fuel system adapted for the automatic extraction and dispersion of entrapped puddles of water in an aircraft fuel tank as a function of fuel flow supply to at least one propulsion engine. Scavenge pipes, positioned to be immersed in the puddles at their inlet openings, are connected to a venturi located within a fuel supply duct and arranged such that fuel drawn through the duct by means of a jet pump induces water extraction by suction at the venturi throat which is subsequently broken up within the jet pump and dispersed in the fuel.

3 Claims, 2 Drawing Sheets

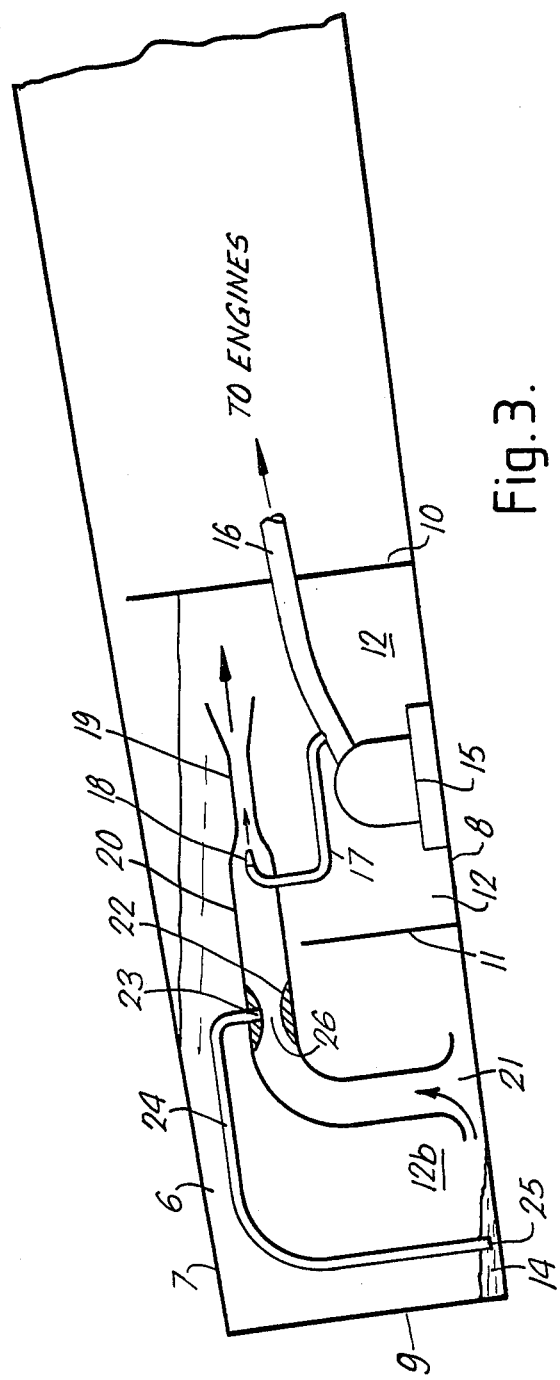

ON-BOARD DISPOSAL OF WATER IN AIRCRAFT FUEL TANKS

This invention relates to means for the on-board disposal of water which collects in aircraft fuel tanks.

Water in aircraft fuel tanks may arise from condensation or be present in fuel entering the tank at the fuelling stage. This water will, to a significant extent, collect at a low point in one or more fuel compartments, for example a booster pump compartment in the form of puddles. Its presence is obviously undesirable and although it may be mechanically drawn off by means of water drain valves it may not be possible to locate such valves in every possible puddle location so that the water content cannot be adequately dealt with. A means of disposal from within the tank would therefore be desirable.

At least one solution is known utilising a dedicated jet pump driven by a fuel bleed off a main booster pump which picks up the water and disperses it as a fine suspension in the fuel from where it would be consumed by the engines. This is not considered to be an ideal solution because the use of a dedicated jet pump or pumps is an added component to the basic fuel system. Furthermore, in any one tank compartment there may be more than one puddle but the dedicated jet pump may only pick up water from one point. If a multiple inlet were fitted to scavenge several puddles the jet pump would pick up water preferentially from the puddle with the greatest head advantage and may thereafter suck fuel through that inlet without scavenging the points served by other inlets. There is a further shortcoming in a dedicated jet pump having a multiple inlet. As soon as the first inlet became uncovered at low level this would cause the jet pump to deprime and cease operation as a function of the air from the first inlet entering the pump. It is the object of the present invention overcome these shortcomings.

According to the present invention there is provided an aircraft fuel system including means for the extraction and dispersion of entrapped puddles of water in a multi-compartment fuel tank, said system including at least one fuel booster pump located within a first tank compartment, fuel supply pipe means extending from said booster pump for the supply of fuel to at least one engine, fuel transfer means for transferring fuel from at least a second tank compartment to said first tank compartment and water extraction and dispersion means associated with said fuel transfer means, said fuel transfer means comprising fuel transfer duct means bridging said first and second tank compartments and having a fuel inlet opening in said second tank compartment, a fuel outlet opening in said first tank compartment and means for effecting a continuous flow of fuel from said second to first tank compartments, said water extraction and dispersion means comprising at least one venturi means within said fuel transfer duct, said venturi including at least one fluid port extending therethrough and connected to at least one scavenge pipe, the or each scavenge pipe configured such that its inlet opening is positioned to ensure immersion in known locations of water entrappment in said fuel tank, the arrangement being such that said continuous fuel flow through said venturi will induce suction in said scavenge pipe whereby entrapped water will be drawn into said fuel transfer duct and broken up and dispersed in said fuel for consumption by the engines.

Preferably the means for effecting a continuous flow of fuel through said fuel transfer duct comprises a jet pump preferably located to the said duct at its outlet end and within which the extracted water will be broken up and dispersed in the fuel.

Preferably also, the jet pump is driven by fuel injection via a nozzle supplied as a bleed flow of fuel from the fuel supply pipe extending from the booster pump.

In the arrangement where multiple scavenge pipes are associated with the venturi, these are not limited solely to dealing with pockets of entrapped water in any one tank compartment but may be extended into additional compartments. Thus, for example, if water is entrapped within the booster compartment, a scavenge pipe can be conveniently routed from the venturi into the first tank compartment.

One embodiment of the invention will now be described, by way of example only, with reference to the accompanying drawings in which:

FIG. 3 illustrates schematically a portion of aircraft fuel system incorporating the arrangement of the present invention.

Figure 1:
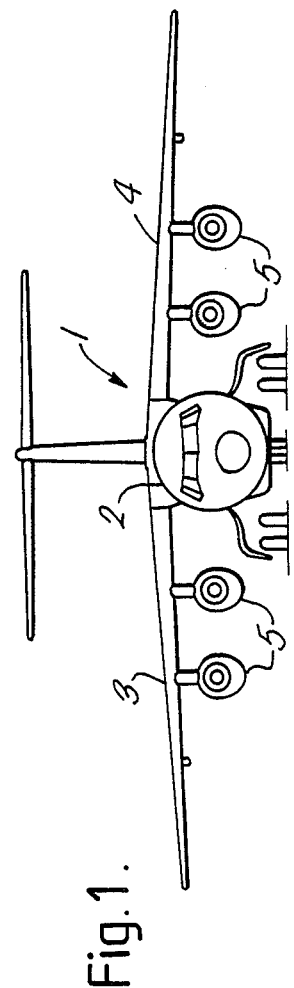
FIG. 1 illustrates a front elevation on a high wing transport aircraft.

Referring to the drawings, FIG. 1 illustrates in front elevation a transport aircraft 1 of high wing configuration including a fuselage 2, winges 3 and 4 having an anhedral angle and, depending from each wing twin pylon mounted high by-pass ratio engines 5.

Figure 2:
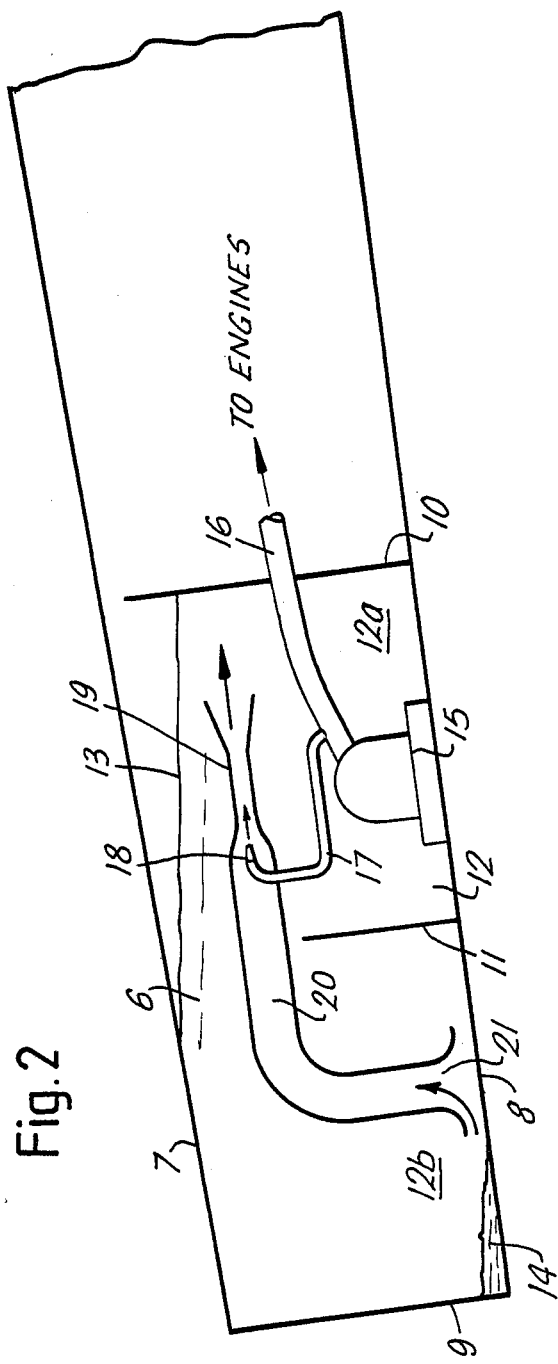
FIG. 2 illustrates schematically a portion of aircraft fuel system contained within an aircraft wing tank.

FIG. 2 represents schematically, in front elevation, a portion of an aircraft integral wing tank 6 comprising an upper wing surface 7 forming the tank upper boundary, a lower wing surface 8 forming the tank lower boundary, an end rib 9, a tank baffle or diaphragm 10 and an intermediate weir diaphragm 11 forming a two part booster pump compartment 12. In accordance with the aircraft of FIG. 1 the wing portion is illustrated as having an anhedral angle but is equally applicable to wings having a dihedral angle. The fuel level is indicated at 13 and water puddle at 14.

The weir diaphragm 11 divides the booster pump compartment 12 into an inboard portion 12a and an outboard portion 12b. The inboard portion 12a includes a booster pump 15 located within the wing tank at its lower boundary and which supplies a main fuel feed pipe 16 to the aircraft engines, the feed pipe passing through the tank diaphragm 10. Branching off the fuel feed pipe 16 is a secondary fuel feed pipe 17 terminating in a nozzle 18 for driving a jet pump 19 connected to a fuel transfer duct 20. This duct 20 extends outwardly into the outboard portion 12b turning downwardly through substantially 90° to terminate in a bell-mouthed inlet opening 21 close to the tank lower boundary. In practice, as the booster pump 15 supplies fuel to the engines via the fuel feed pipe 16 a portion of the fuel passes under pressure via the feed pipe 17 to induce, by means of the jet pump 19, a large continuous flow of fuel from the outboard fuel compartment 12b. The function of this fuel feed arrangement is to lift fuel across the weir 11 to maintain fuel around the booster pump 15, any surplus fuel spilling back over the weir.

This large continuous flow being drawn through the jet pump 19 is beneficially utilised for the purposes of the present invention as illustrated in FIG. 3 by the incorporation into the fuel transfer duct 20 of a venturi 22 including an inlet opening 23 therethrough connecting with a scavenge pipe 24 arranged such that its inlet opening 25 is suitably positioned for immersion in the water puddle 14. The presence of the venturi 22 has no significant or detrimental effect on the performance of the jet pump 19 but induces suction developed at the throat 26 of the venturi to draw entrapped water through the scavenge pipe 24 into the fuel inlet duct 20, broken up within the jet pump 19 and dispersed in the fuel. It will be appreciated that although only one scavenge pipe 24 is illustrated, further pipes as required may be installed to communicate with the venturi 26, their number depending on the location of known water entrappment positions.

The advantage of the venturi arrangement is that each scavenge pipe inlet is independent and scavenging from separate points does not therefore depend on the relative heads of water at each point of water entrappment. A further advantage of this arrangement is that any air drawn in via the scavenge pipe/s 24 will be small compared with the large amount of fuel passing through the jet pump 19 and will consequently not affect its performance.

I claim:

1. An aircraft fuel system including means for the extraction and dispersion of entrapped puddles of water in a multi-compartment fuel tank, said system including at least one fuel booster pump located within a first tank compartment, fuel supply pipe means extending from said booster pump for the supply of fuel to at least one engine, fuel transfer means for transferring fuel from at least a second tank compartment to said first tank compartment and water extraction and dispersion means associated with said fuel transfer means, said fuel transfer means comprising fuel transfer duct means bridging said first and second tank compartments and having a fuel inlet opening in said second tank compartment, a fuel outlet opening in said first tank compartment and means for effecting a continuous flow of fuel from said second to first tank compartments, said water extraction and dispersion means comprising at least one venturi means within said fuel transfer duct, said venturi including at least one fluid port extending therethrough and connected to at least one scavenge pipe, the or each scavenge pipe configured such that its inlet opening is positioned to ensure immersion in known locations of water entrappment in said fuel tank, the arrangement being such that said continuous fuel flow through said venturi will induce suction in said scavenge pipe whereby entrapped water will be drawn into said fuel transfer duct and broken up and dispersed in said fuel for consumption by the engines.

2. An aircraft fuel system according to claim 1 in which said means for effecting a continuous flow of fuel from said second to first tank compartments comprises a jet pump connected to the outlet end of said fuel transfer duct and includes nozzle means for injecting fuel under pressure to drive said jet pump.

3. An aircraft fuel system according to claim 2 in which said nozzle means is supplied with fuel under pressure by means of a bleed pipe extending from the engine fuel supply pipe.

* * * * *